US008997697B1

(12) United States Patent
Dailey

(10) Patent No.: US 8,997,697 B1
(45) Date of Patent: Apr. 7, 2015

(54) AGRICULTURAL SECURITY ASSEMBLY

(76) Inventor: Perry L. Dailey, Vonore, TN (US)

( * ) Notice: Subject to any disclaimer, the term of this patent is extended or adjusted under 35 U.S.C. 154(b) by 340 days.

(21) Appl. No.: 13/544,029

(22) Filed: Jul. 9, 2012

(51) Int. Cl.
*A01K 15/02* (2006.01)
*A01K 29/00* (2006.01)
*A01M 29/16* (2011.01)

(52) U.S. Cl.
CPC ..................................... *A01M 29/16* (2013.01)

(58) Field of Classification Search
CPC ..... A01M 29/16; A01M 29/20; A01M 29/04; A01M 31/06; A01M 15/02; A01M 29/00; A01M 29/06
USPC .............. 119/719, 712; 340/573.2; 116/22 A; 446/300, 303, 330; 43/1, 2, 3
See application file for complete search history.

(56) References Cited

U.S. PATENT DOCUMENTS

| | | | | |
|---|---|---|---|---|
| 2,185,013 | A * | 12/1939 | Bonetti | 43/3 |
| 2,788,762 | A * | 4/1957 | Wright | 116/22 A |
| 4,212,007 | A | 7/1980 | Reyes et al. | |
| 4,573,427 | A * | 3/1986 | Konzak | 116/22 A |
| 4,598,660 | A * | 7/1986 | Konzak | 116/22 A |
| 4,656,770 | A * | 4/1987 | Nuttle | 43/2 |
| 4,773,888 | A * | 9/1988 | Worsham et al. | 446/303 |
| 5,267,886 | A * | 12/1993 | Wood et al. | 446/175 |
| 5,279,063 | A * | 1/1994 | Heiges | 43/3 |
| 5,367,294 | A | 11/1994 | Brown | |
| 5,570,531 | A * | 11/1996 | Sroka | 43/3 |
| 5,603,287 | A | 2/1997 | Houck | |
| 5,878,956 | A * | 3/1999 | Djukastein et al. | 239/69 |
| 5,892,446 | A | 4/1999 | Reich | |
| 5,901,491 | A * | 5/1999 | Caldwell | 43/1 |
| 5,964,055 | A * | 10/1999 | Smith | 43/3 |
| 5,966,075 | A * | 10/1999 | Blanks | 340/573.2 |
| D437,898 | S | 2/2001 | Phillipson | |
| 6,193,580 | B1 * | 2/2001 | Albert et al. | 446/297 |
| 6,351,908 | B1 * | 3/2002 | Thomas | 43/1 |
| 6,481,147 | B2 * | 11/2002 | Lindaman | 43/2 |
| 6,500,043 | B1 * | 12/2002 | Fong | 446/330 |
| 6,658,782 | B2 * | 12/2003 | Brint | 43/2 |
| 6,935,919 | B2 * | 8/2005 | Fong | 446/330 |
| 7,246,569 | B2 * | 7/2007 | Grandy et al. | 116/22 A |
| 7,255,060 | B2 * | 8/2007 | Grandy | 116/22 A |
| 7,364,489 | B1 * | 4/2008 | Iaconis et al. | 446/330 |
| 7,411,504 | B2 * | 8/2008 | Hanscom | 340/572.3 |
| 7,431,629 | B1 * | 10/2008 | Maddocks et al. | 446/376 |
| 7,690,146 | B2 * | 4/2010 | Jong et al. | 43/1 |
| 7,695,341 | B1 * | 4/2010 | Maddocks et al. | 446/330 |
| 7,884,730 | B2 * | 2/2011 | Alvarado | 340/573.2 |
| 7,901,265 | B1 * | 3/2011 | Cameron et al. | 446/330 |
| 2004/0198160 | A1 * | 10/2004 | Fong | 446/330 |
| 2004/0198169 | A1 * | 10/2004 | Hornsby et al. | 446/454 |
| 2005/0160654 | A1 * | 7/2005 | Cosciani | 43/2 |
| 2005/0233675 | A1 * | 10/2005 | Marine et al. | 446/268 |
| 2006/0119482 | A1 * | 6/2006 | Hanscom | 340/573.1 |
| 2006/0213449 | A1 * | 9/2006 | Dodge | 119/329 |
| 2007/0062093 | A1 * | 3/2007 | Hess | 43/3 |
| 2008/0041321 | A1 * | 2/2008 | Jong et al. | 119/719 |
| 2008/0210153 | A1 * | 9/2008 | Alvarado | 116/22 A |
| 2009/0156089 | A1 | 6/2009 | Hoard et al. | |
| 2009/0280717 | A1 * | 11/2009 | Chan | 446/175 |
| 2011/0034103 | A1 * | 2/2011 | Fong et al. | 446/297 |
| 2012/0083182 | A1 * | 4/2012 | Heatherly et al. | 446/175 |
| 2013/0061817 | A1 * | 3/2013 | Matzel et al. | 119/712 |
| 2013/0237122 | A1 * | 9/2013 | Nystrom | 446/300 |
| 2014/0038489 | A1 * | 2/2014 | Sharma et al. | 446/175 |

* cited by examiner

*Primary Examiner* — Yvonne Abbott-Lewis

(57) ABSTRACT

An agricultural security assembly includes a housing that has a head portion, a body portion and a leg portion. The head portion is movably coupled to the body portion. A sensor is coupled to the housing. The sensor senses movement. A processor is coupled to the housing. The processor is operationally coupled to the sensor. The processor is actuated when the sensor senses movement. A speaker is coupled to the housing. The speaker is operationally coupled to the processor. A motor is coupled to the head portion of the housing. The motor is operationally coupled to the processor. The motor moves the head portion of the housing when the processor is actuated. A power supply is coupled to the housing. The power supply is operationally coupled to the processor.

15 Claims, 4 Drawing Sheets

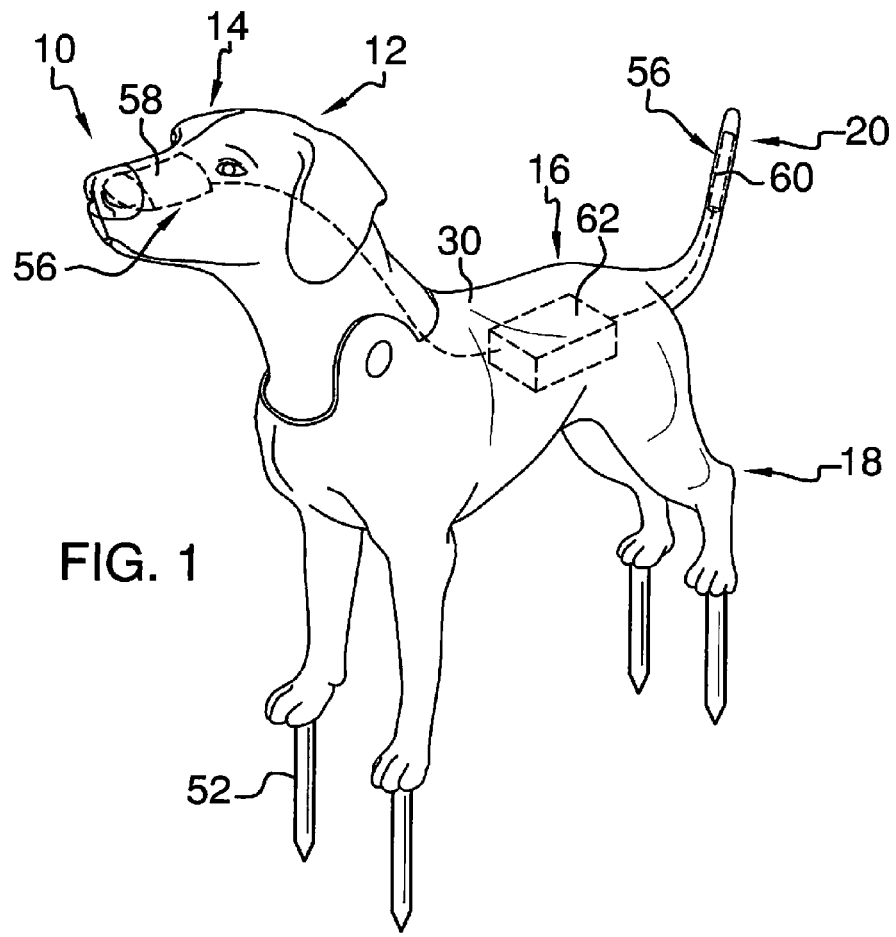
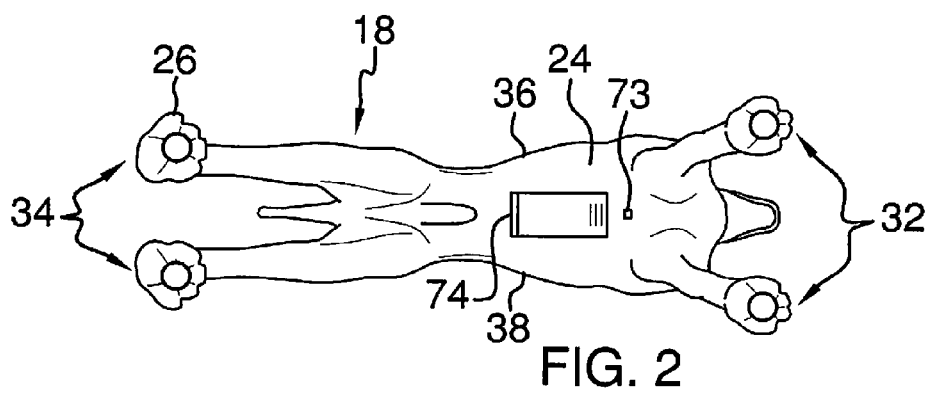

AGRICULTURAL SECURITY ASSEMBLY

BACKGROUND OF THE DISCLOSURE

Field of the Disclosure

The disclosure relates to agricultural security devices and more particularly pertains to a new agricultural security device for protecting an agricultural area from scavengers.

SUMMARY OF THE DISCLOSURE

An embodiment of the disclosure meets the needs presented above by generally comprising a housing that has a head portion, a body portion and a leg portion. The head portion is movably coupled to the body portion. A sensor is coupled to the housing. The sensor senses movement. A processor is coupled to the housing. The processor is operationally coupled to the sensor. The processor is actuated when the sensor senses movement. A speaker is coupled to the housing. The speaker is operationally coupled to the processor. A motor is coupled to the head portion of the housing. The motor is operationally coupled to the processor. The motor moves the head portion of the housing when the processor is actuated. A power supply is coupled to the housing. The power supply is operationally coupled to the processor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a perspective view of a agricultural security assembly according to an embodiment of the disclosure.

FIG. 2 is a bottom view of an embodiment of the disclosure.

DESCRIPTION OF THE PREFERRED EMBODIMENT

Figure 3:
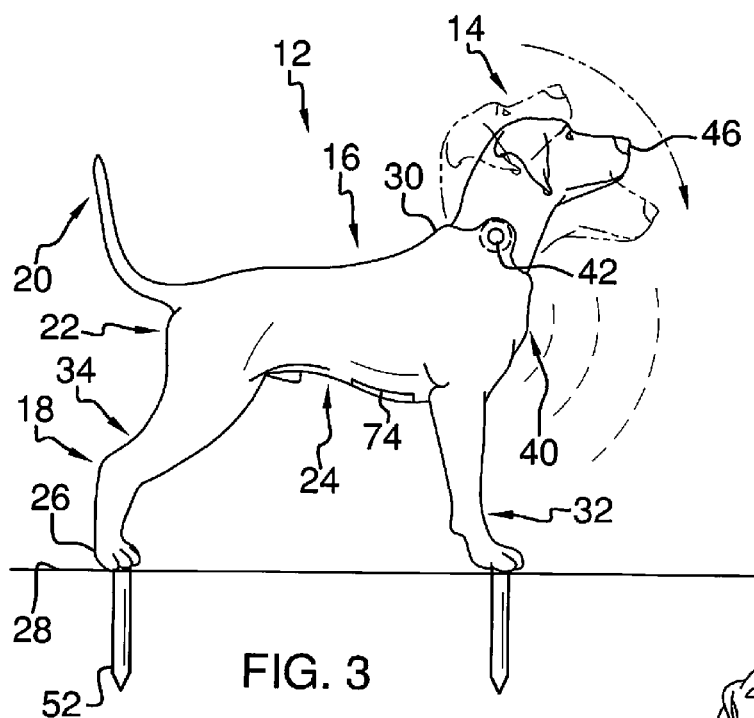
FIG. 3 is a right side view of an embodiment of the disclosure.
Figure 4:
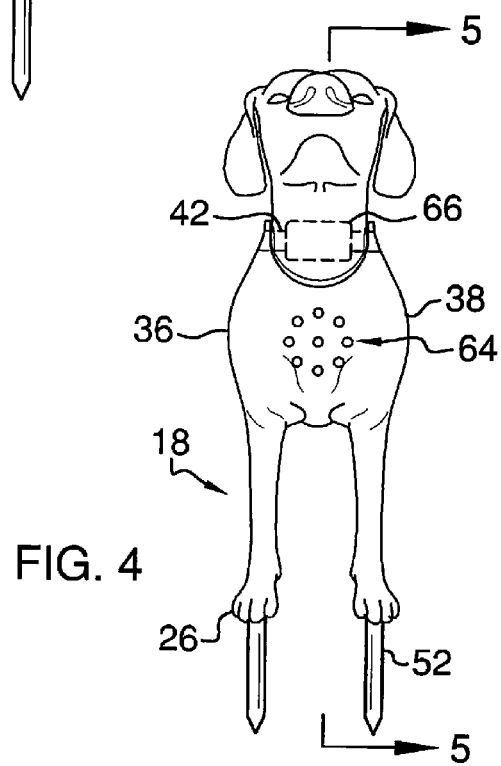
FIG. 4 is a front view of an embodiment of the disclosure.
Figure 5:
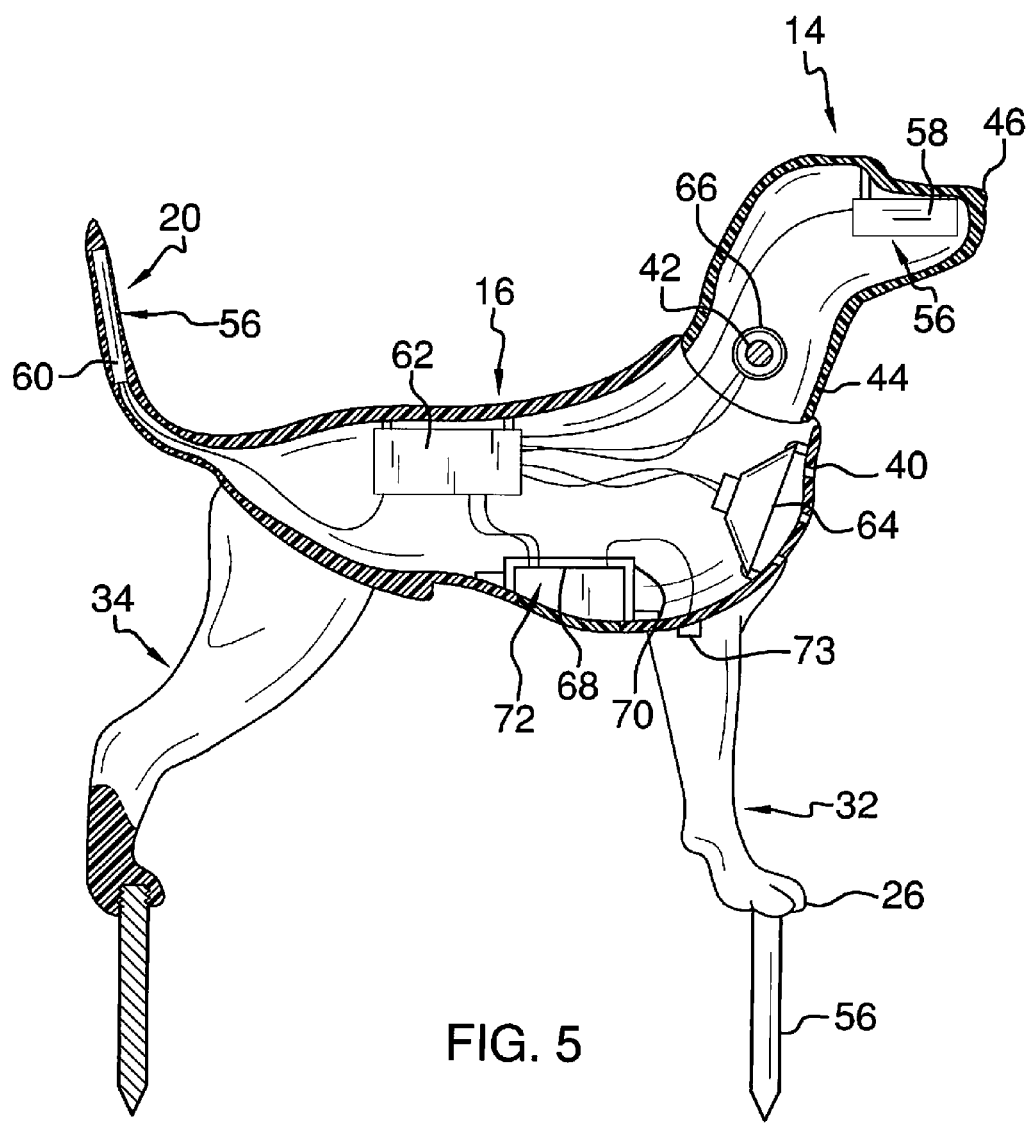
FIG. 5 is a cross sectional view taken along line 5-5 of FIG. 4 of an embodiment of the disclosure.
Figure 6:
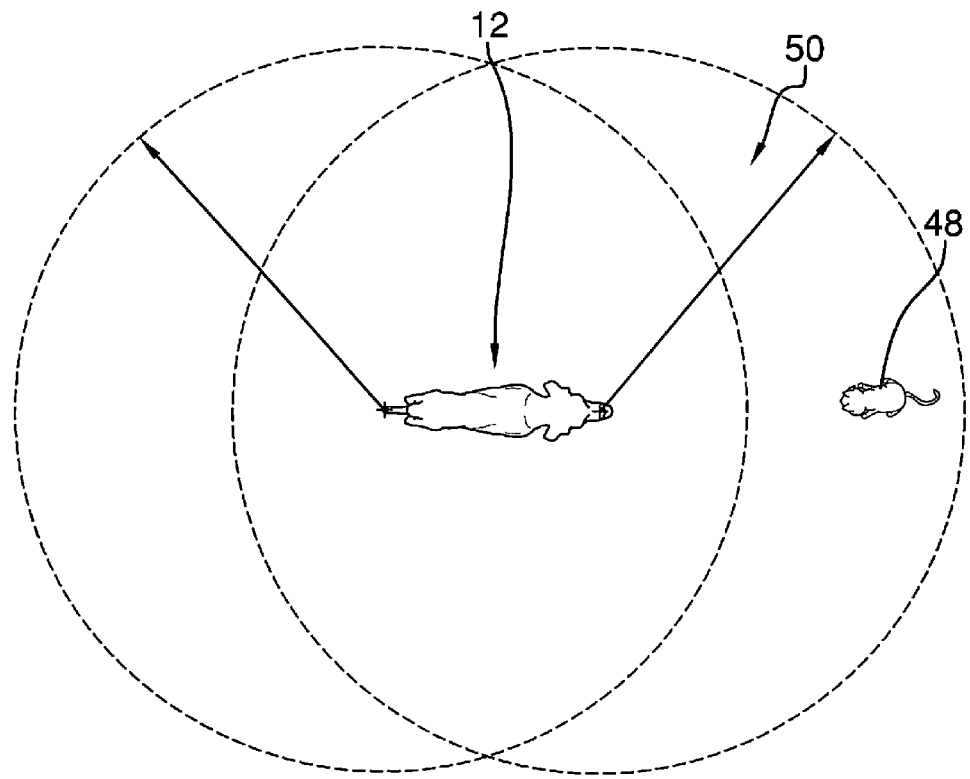
FIG. 6 is an in-use view of an embodiment of the disclosure.
Figure 7:
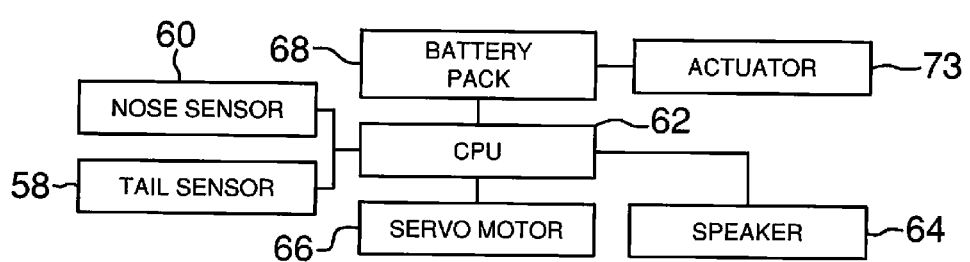
FIG. 7 is a schematic view of an embodiment of the disclosure.

With reference now to the drawings, and in particular to FIGS. 1 through 7 thereof, a new agricultural security device embodying the principles and concepts of an embodiment of the disclosure and generally designated by the reference numeral 10 will be described.

As best illustrated in FIGS. 1 through 7, the agricultural security assembly 10 generally comprises a housing 12 that has a head portion 14, a body portion 16, a leg portion 18 and a tail portion 20. The tail portion 20 of the housing is coupled to and extends upwardly from a rear side 22 of the body portion 16 of the housing 12. The head portion 14 is movably coupled to the body portion 16. The leg portion 18 of the housing 12 is coupled to and extends downwardly from a bottom side 24 of the body portion 16 of the housing 12. A bottom end 26 of the leg portion 18 of the housing 12 may abut a support surface 28 so the body portion 16 of the housing 12 is supported above the support surface 28. The housing 12 may have a canine shape. The housing 12 may have a height between 50 cm and 60 cm at a shoulder 30 of the body portion 16 of the housing 12. The housing 12 may have a length between 90 cm and 115 cm.

The leg portion 18 of the housing 12 is one of a plurality of leg portions 18 of the housing 12. The plurality comprises a front pair 32 and a rear pair 34 of the leg portions 18. The rear pair 34 of the leg portions 18 of the housing 12 is positioned proximal an intersection between the rear side 22 of the body portion 16 of the housing 12 and an associated one of a first 36 and second 38 lateral side of the body portion 16 of the housing 12. The front pair 32 is positioned proximal an intersection between a front side 40 of the body portion 16 of the housing 12 and an associated one of the first 36 and second 38 lateral sides of the body portion 16 of the housing 12.

A rod 42 extends laterally through the front side 40 of the body portion 16 of the housing 12 and laterally through a lower end 44 of the head portion 14 of the housing 12 so the head portion 14 of the housing 12 is movably coupled to the body portion 16 of the housing 12. The head portion 14 of the housing 12 is positionable in a first position that has a nose 46 of the head portion 14 of the housing 12 directed upwardly from the body portion 16 of the housing 12. The head portion 14 of the housing 12 is positionable in a second position has the nose 46 of the head portion 14 of the housing 12 directed downwardly from the body portion 16 of the housing 12. The motion of the head portion 14 of the housing 12 may mimic the motion of a barking canine. The motion of the head portion 14 of the housing 12 may frighten an animal 48 away from an agricultural area 50.

A shaft 52 is coupled to and extends downwardly from a bottom end 26 of the leg portion 18 of the housing 12. The shaft 52 pierces the support surface 28 so the shaft 52 may retain the housing 12 on the support surface 28. The shaft 52 may have a length between 10 cm and 15 cm. A sensor 56 is coupled to the housing 12. The sensor 56 senses movement. The sensor 56 may have an operational range between 27 m and 36 m. The sensor 56 may be a motion detector of any conventional design. The sensor 56 is one of a pair of sensors 56. A first one of the sensors 58 is coupled to the head portion 14 of the housing 12. A second one of the sensors 60 is coupled to the tail portion 20 of the housing 12.

A processor 62 is coupled to the housing 12. The processor 62 is electrically coupled to the sensor 56. The processor 62 is actuated when the sensor 56 senses movement. A speaker 64 is coupled to the housing 12. The speaker 64 is electrically coupled to the processor 62. The speaker 64 emits an audible alarm when the processor 62 is actuated so the speaker 64 may frighten the animal 48 away from the agricultural area 50. The audible alarm may be a canine bark. The audible alarm may have a sound pressure level between 50 dB and 60 dB.

A motor 66 is coupled to the head portion 14 of the housing 12. The motor 66 is electrically coupled to the processor 62. The motor 66 is operationally coupled to the rod 42. The motor 66 is actuated when the processor 62 is actuated. The motor 66 urges the head portion 14 of the housing 12 alternatively between the first position and the second position when the processor 62 is actuated. The motor 66 may have an operational voltage between 12 volts DC and 14 volts DC.

A power supply 68 is coupled to the housing 12. The power supply 68 is electrically coupled to the processor 62. The power supply 68 is positioned within a power supply well 70 extending into the bottom side 24 of the body portion 16 of the housing 12. The power supply 68 may comprise at least one battery 72. The power supply 68 may have a voltage output between 12 volts DC and 14 volts DC. An actuator 73 is coupled to the housing 12. The actuator 73 is electrically coupled to the power supply 68. The actuator 73 selectively actuates and de-actuates the power supply 68. A cover 74 is removably positioned over the power supply well 70.

In use, the housing 12 may be positioned within the agricultural area 50 to detect the intrusion of animals 48 into the agricultural area 50. The assembly 10 may provide an audio and visual alarm to frighten the animals 48 from the agricultural area 50 in order to protect the agricultural area 50 from scavenging. The assembly 10 may be used as a visual deterrent with the actuator 73 de-actuated, or the assembly 10 may be used with the actuator 73 actuated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An agricultural security assembly comprising:
   a housing having a head portion, a body portion and a leg portion, said head portion being movably coupled to said body portion;
   a sensor coupled to said housing, said sensor sensing movement;
   a processor coupled to said housing, said processor being operationally coupled to said sensor, said processor being actuated when said sensor senses movement;
   a speaker coupled to said housing, said speaker being operationally coupled to said processor;
   a motor coupled to said head portion of said housing, said motor being operationally coupled to said processor, said motor moving said head portion of said housing when said processor is actuated;
   a power supply coupled to said housing, said power supply being operationally coupled to said processor;
   a bottom end of said leg portion of said housing being configured to abut a support surface; and
   a shaft coupled to and extending downwardly from a bottom end of said leg portion of said housing, said shaft being configured for piercing the support surface whereby said shaft retains said housing on the support surface.

2. The assembly according to claim 1, further including a rod extending through a front side of said body portion of said housing and a lower end of said head portion of said housing whereby said head portion of said housing is movably coupled to said body portion of said housing, said head portion of said housing being positionable in a first position having a nose of said head portion of said housing being directed upwardly from said body portion of said housing, said head portion of said housing being positionable in a second position having said nose of said head portion of said housing being directly downwardly from said body portion of said housing.

3. The assembly according to claim 1, further including said leg portion of said housing being coupled to and extending downwardly from a bottom side of said body portion of said housing.

4. The assembly according to claim 3, further including said leg portion of said housing being one of a plurality of leg portions of said housing, said plurality comprising a front pair and a rear pair of said leg portions, said rear pair of said leg portions of said housing being positioned proximal an intersection between a rear side of said body portion of said housing and an associated one of a first and second lateral sides of said body portion of said housing, said front pair being positioned proximal an intersection between a front side of said body portion of said housing and an associated one of said first and second lateral sides of said body portion of said housing.

5. The assembly according to claim 3, further including a bottom end of said leg portion of said housing being configured to abut a support surface whereby said body portion of said housing is supported above the support surface.

6. The assembly according to claim 1, further comprising:
   a tail portion of said housing coupled to and extending upwardly from a rear side of said body portion of said housing; and
   said sensor being one of a pair of sensors, a first one of said sensors being coupled to said head portion of said housing, a second one of said sensors being coupled to said tail portion of said housing.

7. The assembly according to claim 1, further including said processor being electrically coupled to said sensor.

8. The assembly according to claim 1, further including said speaker being electrically coupled to said processor, said speaker emitting an audible alarm when said processor is actuated whereby said speaker is configured to frighten an animal away from an agricultural area.

9. The assembly according to claim 1, further comprising:
   a rod extending through a front side of said body portion of said housing and a lower end of said head portion of said housing;
   said head portion of said housing being positionable in a first position and a second position; and
   said motor being electrically coupled to said processor, said motor being operationally coupled to said rod, said motor being actuated when said processor is actuated, said motor urging said head portion of said housing alternatively between said first position and said second position when said processor is actuated, whereby said head portion of said housing is configured to frighten an animal away from an agricultural area.

10. The assembly according to claim 1, further including said speaker being electrically coupled to said processor, said speaker emitting an audible alarm when said processor is actuated.

11. The assembly according to claim 1, further including said power supply being electrically coupled to said processor.

12. The assembly according to claim 1, further including said power supply being positioned within a power supply well extending into a bottom side of said body portion of said housing.

13. The assembly according to claim 1, further including said power supply comprising at least one battery.

14. The assembly according to claim 1, further comprising:
 a power supply well extending into a bottom side of said body portion of said housing; and
 a cover removably positioned over said power supply well.

15. An agricultural security assembly comprising:
 a housing having a head portion, a body portion, a leg portion and a tail portion, said tail portion of said housing being coupled to and extending upwardly from a rear side of said body portion of said housing, said head portion being movably coupled to said body portion, said leg portion of said housing being coupled to and extending downwardly from a bottom side of said body portion of said housing, a bottom end of said leg portion of said housing being configured to abut a support surface whereby said body portion of said housing is supported above the support surface, said leg portion of said housing being one of a plurality of leg portions of said housing, said plurality comprising a front pair and a rear pair of said leg portions, said rear pair of said leg portions of said housing being positioned proximal an intersection between said rear side of said body portion of said housing and an associated one of a first and second lateral sides of said body portion of said housing, said front pair being positioned proximal an intersection between a front side of said body portion of said housing and an associated one of said first and second lateral sides of said body portion of said housing;
 a rod extending through said front side of said body portion of said housing and a lower end of said head portion of said housing whereby said head portion of said housing is movably coupled to said body portion of said housing, said head portion of said housing being positionable in a first position having a nose of said head portion of said housing being directed upwardly from said body portion of said housing, said head portion of said housing being positionable in a second position having said nose of said head portion of said housing being directly downwardly from said body portion of said housing, whereby said head portion of said housing is configured to frighten an animal away from an agricultural area;
 a shaft coupled to and extending downwardly from a bottom end of said leg portion of said housing, said shaft being configured for piercing the support surface whereby said shaft retains said housing on the support surface;
 a sensor coupled to said housing, said sensor sensing movement, said sensor being one of a pair of sensors, a first one of said sensors being coupled to said head portion of said housing, a second one of said sensors being coupled to said tail portion of said housing;
 a processor coupled to said housing, said processor being electrically coupled to each of said sensors, said processor being actuated when said sensor senses movement;
 a speaker coupled to said housing, said speaker being electrically coupled to said processor, said speaker emitting an audible alarm when said processor is actuated whereby said speaker is configured to frighten an animal away from an agricultural area;
 a motor coupled to said head portion of said housing, said motor being electrically coupled to said processor, said motor being operationally coupled to said rod, said motor being actuated when said processor is actuated, said motor urging said head portion of said housing alternatively between said first position and said second position when said processor is actuated;
 a power supply coupled to said housing, said power supply being electrically coupled to said processor, said power supply being positioned within a power supply well extending into said bottom side of said body portion of said housing, said power supply comprising at least one battery; and
 a cover removably positioned over said power supply well.

\* \* \* \* \*